Patented Feb. 20, 1951

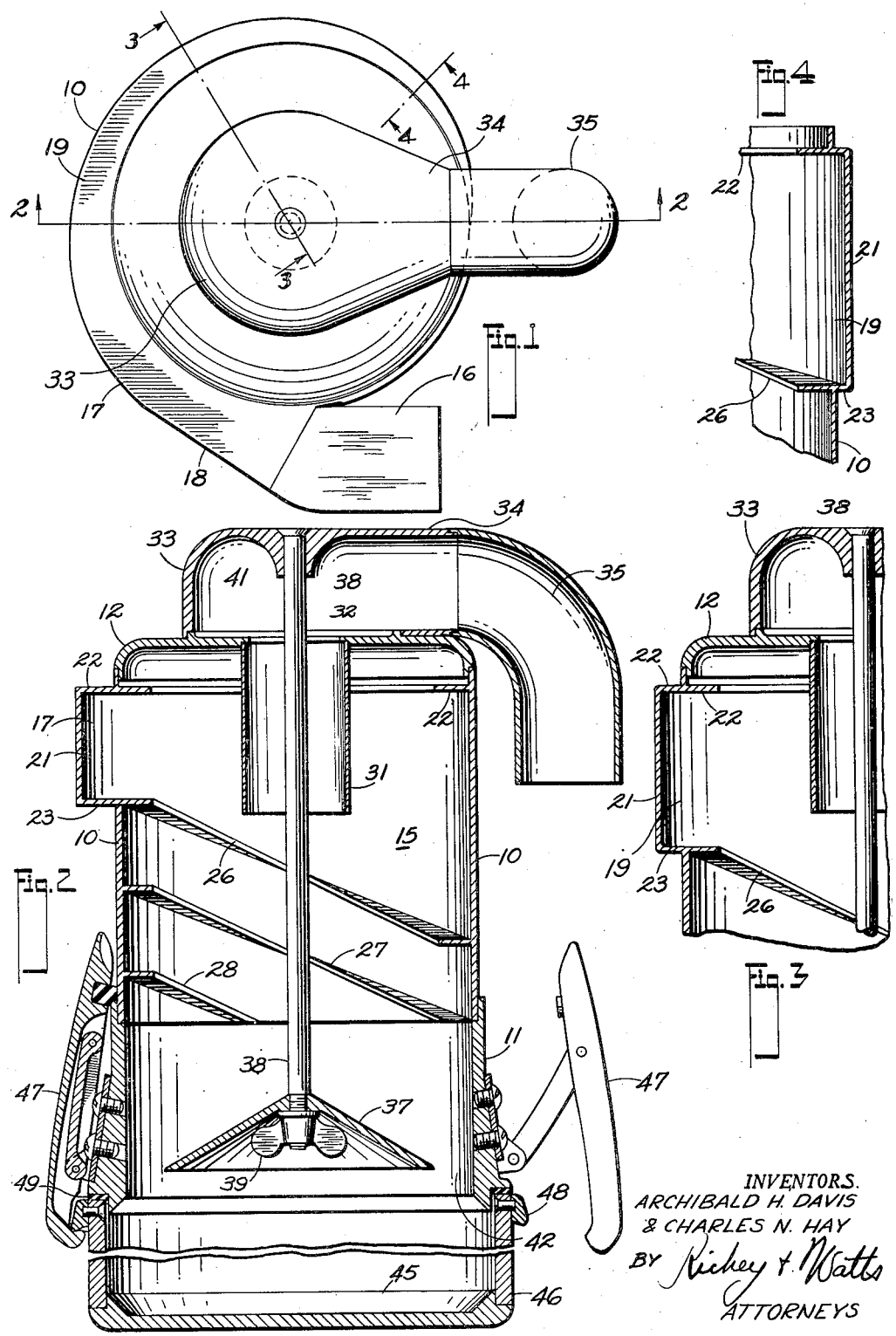

2,542,635

UNITED STATES PATENT OFFICE 2,542,635

CENTRIFUGAL DUST SEPARATOR

Archibald H. Davis and Charles N. Hay, Sandusky, Ohio, assignors to The Apex Electrical Mfg. Co., Cleveland, Ohio, a corporation of Ohio Application January 27, 1948, Serial No. 4,664

5 Claims. (Cl. 183—83)

This invention relates to the separation of entrained matter from gas by the application of centrifugal and other forces to the gas and entrained matter.

One field of application of the invention is in vacuum cleaners, in which the separator may be used to replace bags and filters, as described in our copending application for "Dust Separator," Serial No. 788,850, filed November 29, 1947. That application discloses a dust separator having certain principles and features in common with the separator which is the subject matter of this application, and the two separators may be regarded as species of a generic invention claimed in the said copending application.

An object of the invention is to improve the centrifugal separation of solids from gases by subjecting the dust laden air to forces which rarefy and accelerate the air in a zone in which separation takes place, so that centrifugal force is increased, the mass of the air is decreased, the viscosity of the air is reduced by the reduction in temperature due to expansion thereby permitting dust particles to move more freely through the air, and the relative humidity of the air is increased so that the dust particles pick up more moisture and are increased in mass. In this way the separating efficiency is increased in an exponential ratio to the pressure drop through the separator, and by the use of a pressure drop of twenty to thirty inches of water complete separation for all practical purposes is obtained.

Further objects of the invention are to improve and increase the efficiency of centrifugal separators of the cyclone type for separating dust and dirt from air to such an extent as to permit the use of such separators in vacuum cleaners; to produce in such a separator a plurality of interacting cyclones producing different amounts of centrifugal force; to collect all of the material separated from the air stream in a single container without interfering with the operation of the cyclones and without permitting any of the separated material to become again entrained in the air stream; to maintain the separating efficiency of the centrifugal separator substantially constant through a wide variation in the quantity of air passing through the separator in a given interval of time, so that the operation of the separator is not affected by variations in the extent to which the nozzle of the vacuum cleaner is sealed against the rug or other surface being cleaned; and to prevent large objects, strings, lint and the like from being caught in the inlet or the outlet of the separator or in the entrance into the dirt collecting receptacle.

Other objects of the invention are to simplify and improve the construction of a separator and to adapt the same to small flows of gas.

A still further object is to direct and guide the flow of gas in a helical path along the casing of a separator.

These and other objects, which will appear from the following description of preferred embodiments of the invention, are achieved by a new combination and arrangement of elements, and a new method of treating the dust laden air stream, involving the application of centrifugal and other forces to the air and the entrained dust, dirt and other foreign matter. Generally speaking, the dirt laden air stream entering the shell of the separator is subjected to axial and tangential forces of such magnitude as to cause the stream to move in a helical path along the shell and to force entrained solid matter radially toward the shell, the main body of the air stream is then subjected to an axial force in the opposite direction and centripetal forces causing it to move in a smaller helical path in the opposite axial direction from the first helical path so as to develop an increased centrifugal force on the entrained particles, while the foreign matter which has been forced against the wall of the shell continues to move in the first mentioned helical path into a dirt receptacle in which the air is whirling in the same direction as the air in the first helical path, but is sufficiently free of axial currents to prevent separated dust and dirt from being picked up and again suspended in the air. The forces are applied so that the air moving in the inner helical path is considerably reduced in pressure, density, temperature and viscosity and entrained particles are subjected to an increased centrifugal force and are thereby given sufficient velocity and momentum in a radial direction to move through the entering air and into the stream of foreign matter adjacent the shell which enters the dirt receptacle.

Referring to the drawings:

Fig. 1 is an end view of a separator in accordance with the invention;

Fig. 2 is a longitudinal section of the same taken on the plane indicated by the line 2—2 in Fig. 1;

Fig. 3 is a partial longitudinal section of the same taken on the plane indicated by the line 3—3 in Fig. 1; and Fig. 4 is a partial longitudinal section of the casing taken on the plane indicated by the line 4—4 in Fig. 1.

The separator comprises a substantially cylindrical shell which may be formed in two portions, an upper portion 10 and a lower portion 11, the portion 10 being seated in a recess in the portion 11 and in sealing engagement therewith, the assembly being made in any desired manner. A flanged annular cap 12 is seated against the upper end of the shell 10. A separating chamber 15, within which the entrained material (which will be referred to as dust for conciseness) is separated from the air or other gas, is defined by the shell portions 10 and 11 and the cap 12. The dust-laden air enters the separating chamber through an inlet conduit 16 which is preferably substantially square in cross section and which may be roughly tangent to the shell 10. The inlet conduit 16 merges into a generally spiral air inlet 17, the initial portion 18 of which may be straight, but which merges into a spiral portion 19 of decreasing radius which preferably extends around two-thirds to three-fourths of the circumference of the casing 10. The inlet 17 is open on the side toward the axis of the casing, being defined by an outer wall 21, a top wall 22, and a bottom wall 23.

The top wall continues around the casing in the form of an inwardly directed flange adjacent the top of the casing section 10 lying in a plane perpendicular to the axis of the casing. The bottom wall 23 of the inlet portion 18 lies in a plane perpendicular to the axis of the casing, but as the converging spiral portion 19 of the inlet is reached, the bottom wall 23 is deflected downward into a helix. The wall 23 thus forms a helical rib 26 within the casing, and in addition, extends outside the casing by an amount which diminishes as the spiral converges, as will be apparent from a comparison of the left hand side of Fig. 2, Fig. 3, and Fig. 4, which are sectional views of the inlet taken progressively around the casing in the direction of air flow. At the right hand side of Fig. 2, the spiral portion 19 of the inlet merges into the casing and there remains only the inwardly directed rib 26.

Due to the inclination of the wall 23 and rib 26, the inlet progressively increases in depth parallel to the axis of the container as will be apparent from Figs. 2, 3, and 4. Thus, as the inlet decreases in radius, it increases in depth; and the entering air stream under the influence of centrifugal force fans out into a thin sheet adjacent the wall of the casing. The lateral expansion of the entering air stream imparts to it a downward component of velocity so that the air tends to follow a helical path along the wall of the casing. The air follows the casing under the influence of centrifugal force, thus permitting the omission of the inner wall of the inlet. By omitting the inner wall of the inlet and expanding the inflowing air into a wide, thin stream through the employment of centrifugal force, the effect of an elongated rectangular nozzle is secured without its attendant disadvantage that large objects will clog a narrow nozzle. The inlet construction is disclosed and claimed in our abovementioned copending application, wherein its principles and advantages are more fully discussed.

Additional helical ribs 27 and 28 within the portion 10 of the casing continue to direct the air in a helical path in which it continues under its own momentum after entering the casing section 11. In a separator about four to five inches in diameter, a pitch of about three inches for the helices 26, 27, 28 has been found to be a satisfactory value.

The air enters the casing at high velocity, either by being forced into the separator or by being drawn out by suction. The air leaves the separator through an axial cylindrical outlet 31 which is fixed to the cap 12 circumjacent the central opening 32 in the cap. From the outlet 31, the air is forced or drawn through an outlet fitting 33 which may be of the form illustrated in Figs. 1 and 2 with a lateral outlet 34 to which any outlet pipe such as 35 may be fitted.

The manner in which the various parts of the casing and outlet are secured together forms no part of the present invention. Any accepted fabrication technique may be employed.

The upper end of the inlet chamber 15 in Fig. 2 is closed, except for the outlet opening, by the cap 12, and the opposite end of the separating chamber is defined by a baffle 37 which may be slightly conical in form as illustrated in Fig. 2 or may be flat as in our abovementioned application. The baffle 37 is preferably mounted slightly within the casing portion 11 and may be maintained in position by a rod 38 to which it is secured by a thumb screw 39. The rod 38 is fixed in any convenient manner in a boss 41 in the outlet fitting 33 and extends through the center of the outlet 31. The baffle 37 is spaced from the inner wall of the casing portion 11 to leave an annular passage 42 through which dust passes from the separating chamber into a collecting chamber 45 defined by a cylindrical cup 46, which may be of any desired material and of any convenient depth, preferably of a depth equal to or greater than its diameter to provide for the reception of a considerable quantity of dust. The cup 46 may be retained on the casing section 11 by conventional toggle clamps 47 fixed to the casing section 11 and engaging lugs 48 fixed to the cup. A gasket 49 may be provided between the parts 11 and 46 to prevent air leakage. By this construction, the cup 46 may be easily removed to dispose of accumulated dirt.

It will be understood that the baffle 37 may be supported from the cup 46, but the construction shown is preferred inasmuch as it facilitates the disposition of the accumulated dirt.

The annular space 42 should be of sufficient width to permit the passage of the largest bodies that are likely to be encountered; for example, in vacuum cleaner service, the gap 42 should be wide enough to pass cigarette stubs and other objects of similar size.

It will be noted that the air outlet 31 extends into the casing below the bottom of the air inlet 18. As will be clearer from the appended description of the operation set out below, this arrangement assists in preventing direct flow of air from the inlet to the outlet, which direct flow, if it occurred, would carry dust particles into the outlet.

Having explained the form and construction of a preferred embodiment of the invention, we may proceed to a description of the operation of the separator.

The dust-laden air stream enters the separating chamber 15 through the inlet 16, 18 at a high speed, and expands axially of the casing as it proceeds around the deepening spiral portion 19 of the inlet. The expansion of the air stream reduces it to a thin sheet and imparts to it a component of velocity longitudinally of the casing. The ribs 27 and 28 guide the air in a continuation of a helical path initiated by the descending lower wall of the inlet, resulting in a helical movement of air immediately adjacent the shell 10, which continues adjacent the shell portion 11. In a small separator with an inlet about seven-eighths inch square, the air stream is flattened out by centrifugal force to a thickness of about one-quarter of an inch.

The centrifugal force developed by the circumferential component of the movement of the air stream urges the dust and dirt entrained in the air radially outward toward the shell 10, 11 as the air stream moves downwardly in the helical path. By reason of the fact that the dust laden air stream is free to spread axially with a consequent reduction of its radial depth under the influence of the centrifugal force, the distance through which each dust or dirt particle in the incoming air stream must move in order to reach the shell is reduced to a minimum. The rate at which any particular particle of dust or dirt moves radially outward through the air under the influence of the centrifugal force depends upon its specific gravity and upon the relation between the mass and shape of the particle, which in turn determines the resistance to the movement of that particular particle through air of a given density and viscosity. The heavier particles, and those whose shape is such as to minimize air resistance, are quickly projected through the air stream toward the shell 10. Lighter particles, and those having a greater air resistance, move radially outward at a slower rate.

When the downwardly moving helical stream of air admitted from the inlet reaches the baffle 37 substantially all of the air is drawn inwardly by the reduced pressure in the center of the separator in a generally spiral path above the baffle 37, and then is drawn upwardly in a helical path substantially smaller in radius than the first-mentioned helical path toward the outlet pipe 31. This reversal of the axial direction of movement of the air is effected by a combination of factors. In the first place, the force which produces the movement of the air through the separator results from the fact that the pressure in the outlet tube 31 is less than the pressure in the inlet conduit 16, so that flow of air is established from the inlet 16 to the outlet pipe 31. Since the low pressure area produced in the separator below the outlet pipe is confined by the imperforate baffle 37, there is substantially no pressure difference acting to urge the air to pass through the annular opening 42 into the dust chamber 45, and at the same time a substantial pressure difference exists above the baffle urging the air radially inward along the upper surface of the baffle.

Particles of dirt and dust which are close to the wall of the shell during the downward helical movement of the incoming air stream are projected in a continuation of their helical path downwardly through the annular gap 42 and along the wall of the dust chamber 45. The air in the dust chamber rotates in the same direction as the incoming air in the outer helix so that the dust particles are transferred smoothly and without turbulence from the helically or spirally moving air above the baffle to the rotating body of air below the baffle. The momentum imparted to the particles of dust and dirt moving in the helical path along the wall of the shell causes those particles to move through the gap 42 and to be projected to the bottom of the dust container 46. The dust particles are not carried back to the shell 10, 11 because there is insufficient axial movement of the air in the container 46 to entrain the dust.

The main body of the air stream, and any particles of dust and dirt which did not come close to the wall of the shell 10, 11 during the downward helical movement of the air stream, move inwardly above the baffle 37 and then upwardly in a helical path toward the outlet pipe 31. In this movement, the air stream has a circumferential component of movement in the same direction as the air at the outer portion of the shell, and an axial component of movement in the opposite direction. The linear rotational velocity of the air moving downwardly in the outer helix, or cyclone, is not reduced by drawing the air into the upwardly moving helix or cyclone, and since the radius is reduced the angular velocity of the air is increased and centrifugal force developed in the inner helix is increased. This increase in the centrifugal force applies an increased force to entrained dirt and dust particles, tending to force them radially outward into the downwardly moving outer helix.

Since the entire body of air in the shell above the baffle 37 is moving circumferentially in the same direction, the static pressure of the air has a maximum value adjacent the wall of the shell and decreases considerably to a minimum value at the center of the shell. Thus the density and viscosity of the air in the inner helix or cyclone is substantially less than the density and viscosity of the air adjacent the shell 10, 11, so that the air resistance to the movement of any particle of dust or dirt is less in the inner cyclone than in the outer cyclone. Thus particles whose shape is such that they move through the air stream slowly in the outer cyclone under a given centrifugal force would move more rapidly through the air in the inner cyclone even if there were no increase in centrifugal force in the inner cyclone. This reduction in density and viscosity in the air in the inner cyclone, combined with the increased centrifugal force existing in the inner cyclone, increases by many times the speed at which particles of dust and dirt are separated from the air and projected radially outward. In addition, the considerable length of the inner cyclone, caused by the fact that it starts at the baffle, gives the dirt time to pass outwardly into the outer helical air stream before the inner cyclone air enters the outlet pipe 31.

Other factors also increase the effectiveness of the dust and dirt separation in the inner cyclone as compared to the outer cyclone. Since the pressure and density of the air entering the outlet pipe 31 is less than the pressure and density of the incoming air, and because air in a confined passageway expands in the direction of its movement, the linear velocity of the air in the inner cyclone is greater than the linear velocity of the entering air, since the mass of air leaving the separator is equal to the mass of air entering the separator. This increase in linear velocity further increases the centrifugal force.

Dust and dirt particles which remain entrained in the air entering the inner cyclone above the baffle 37 are projected radially outward at a substantially increased velocity and with sufficient momentum to pass through the stream of incoming air forming the outer cyclone to a point near the shell 10, 11, where they agglomerate with other dust and dirt particles and move downwardly in the outer helical path through the annular opening 42 into the dust chamber 45. In this way, particles having a specific gravity or air resistance such that they cannot be separated successfully from the air stream in the outer cyclone, are not only separated from the air in the inner cyclone, but are thrown outwardly with sufficient force to pass through the outer cyclone into the stream of dust and dirt moving along the wall of the shell and are deposited in the dust chamber.

Thus in operation the entire body of air in the shell 10, 11 is rotating rapidly in one direction, the outer portion of the air having a downward movement in a helical path and the inner portion having an upward helical movement. The air pressure in the shell is greatest around the wall of the shell and decreases to a minimum at the center, the variation in pressure having an exponential relation to the radius because of the increased centrifugal force of the upwardly moving inner portion of the body of air. The imperforate baffle 37 seals off the lower end of the inner cyclone and the low pressure area. The incoming air is given sufficient momentum both circumferentially and downwardly by the widening tangential inlet and the helical vanes 26, 27, 28 to drive the air stream in a helical path to the baffle 37, and to prevent any appreciable portion of the incoming air from short-circuiting to the low pressure area in the inner cyclone until it substantially reaches the baffle. Thus the baffle may be located at any distance below the lower end of the outlet pipe 31 within which these conditions may be maintained with a given flow of air. Preferably the baffle is located as far from the lower end of the outlet pipe 31 as is possible without impairing the air velocity by an excessive amount of friction against the walls of the separator, so as to obtain the maximum possible length of the inner cyclone. However, the distance of the baffle from the lower end of the outlet pipe is limited by the available pressure for operating the separator, since increasing this distance increases the pressure drop through the separator required to maintain the air velocity.

The size of the baffle 37 and the radial width of the gap 42 are determined first by the requirement that the baffle shall extend across and seal off the extreme low pressure area created by the inner cyclone, and second by the requirement that the extent of axial flow of the air in the dust chamber 45 shall be so small as not to again entrain in the air stream dust particles deposited in the dust chamber.

The annular gap 42 permits only a relatively small percentage of the total quantity of air moving downwardly in the outer helix to enter the dust chamber 45 with the stream of dust and dirt concentrated along the wall of the shell, so that substantially all of the air in the outer helix is separated from the dust and dirt and moves inwardly in a substantially spiral path above the baffle 37. This separation of the air from the dirt at the annular gap 42 is effected primarily by the pressure gradient in the air stream that draws the air to the inner cyclone, as distinguished from a mechanical skimming action. The body of air confined in the dust chamber below the baffle 37 is entrained by, and caused to rotate with, the air in the outer cyclone in the shell 11. Thus, for a short distance down from the baffle and for a radial distance from the separator wall equal to the annular gap between the baffle and the separator wall, the pressure decreases with the radius in the dust chamber 45 at substantially the same rate as the pressure varies with the radius in the outer cyclone in the shell 11, so that the pressure is substantially the same above and below the annular opening 42 at any point in the radial depth of the annular opening. Thus so long as the outer edge of the baffle is located radially outward beyond the point at which the pressure in the shell 11 is substantially affected by the inner cyclone, there is no substantial difference in the pressure above and below the gap 42. With no pressure difference across the annular opening there is no appreciable air flow across this gap to carry entrained dirt from the dirt container back into the separator and the operation at the gap 42 is therefore primarily a smooth interchange of the dust and dirt particles from a stream of air in the shell 11 moving helically and spirally to a body of air in the dust chamber 45 rotating at the same speed as the air in the shell without eddies or turbulence or substantial axial movement of air through the gap 42.

There is, therefore, no close critical limit to the radial extent of the gap 42, and it may be made sufficiently wide to permit the free passage of cigarette butts and similar debris, that may be picked up by a vacuum cleaner, into the dust chamber 45.

The interaction of the inner and outer cyclones within the separator itself involves other novel effects contributing to the high separating efficiency of the present invention. The drawing of the air from the outer cyclone into the inner cyclone against the action of centrifugal force reduces the pressure, increases the linear velocity of the air in the inner cyclone, and reduces the radius of the whirling motion of the air. The centrifugal force is thereby increased, producing a large reduction in pressure near the axis of the inner cyclone, and a large pressure drop across the separator. Contrary to the usual practice of attempting to keep the pressure drop across the separator as low as possible in order to conserve power, in the present invention a high pressure drop is used to take advantage of the accompanying phenomena.

Thus, in accordance with this invention, the centrifugal force opposing the withdrawal of the air from the separator is maintained at such magnitude as to cause a pressure drop exceeding 20 inches of water across the separator. The reduction in pressure near the axis of the inner cyclone greatly exceeds the drop across the separator; for example, with a pressure drop across the separator of 30 inches of water there is a negative pressure of about 60 inches of water near the axis of the inner cyclone. Under these conditions, a number of cumulative effects combine to give complete separation for all practical purposes. The reduced density of the air in the inner cyclone increases the difference between the specific gravities of the air and the dust particles. Thus a given centrifugal force imparts a greater outward acceleration to dust particles. At the same time the reduction in pressure is accompanied by a reduction in temperature, which reduces the viscosity, and an increase in relative humidity of the air in the inner cyclone. Since the dust particles are slightly hygroscopic, the increase in relative humidity causes them to pick up additional water from the air, thereby increasing their weight. While these various effects are insignificant in the pressure ranges ordinarily used in air cleaning apparatus and processes, their combination results in an exponential curve that rises very rapidly to an effective value when pressure drops across the separator exceeding 20 inches of water are employed in accordance with this invention.

As an example of suitable dimensions and proportions for a separator in accordance with the invention, we may consider a separator designed for use in a vacuum cleaner with a fan which produces a negative pressure of 42 inches of water with the cleaner in normal operation, handling about 46 cubic feet of air per minute. A separator according to the following dimensions has been found very satisfactory: The inlet conduit 16 is ⅞ inch square and thus the air inlet velocity is about 9000 feet per minute. The shell 10 is about 4¼ inches in diameter, the outlet tube 31 is about 1⅜ inches in diameter and 2 inches in length, the distance from the mouth of the outlet 31 to the baffle 37 is about 3½ inches. The preferred width of the gap 42 is in the range of ¼ to ½ inch. The collecting chamber 45 is preferably as long as possible to permit the retention of a considerable quantity of dust and thus eliminate the need for frequent emptying of the dust cup although it may be considerably shorter than the separating chamber. It will be understood that the invention is not limited to these dimensions, or to any of them, but that these represent suitable dimensions and proportions for a separator to be used with a fan and cleaner having the foregoing characteristics.

It is to be understood, of course, that the separator, although suitable for the extremely severe requirements of vacuum cleaner service, is not in any sense restricted to any particular environment, and the vacuum cleaner application has been cited merely by way of example.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

We claim:

1. An air cleaner comprising an elongated generally cylindrical shell having closed ends; a barrier fixed in said shell transversely to the axis thereof and dividing the interior of the shell into a separating chamber and a dust collecting chamber, the barrier being supported by a member extending downwardly coaxially of the shell and being spaced from the shell to provide an annular passage between the two chambers; a tangential air inlet into the end of the separating chamber remote from the barrier; an air outlet conduit extending beyond the inlet; and means adjacent the inlet end of the shell for utilizing the momentum of the air to impart a helical flow thereto comprising helical vanes extending inwardly from the shell.

2. A dust separator comprising a casing of circular cross-section, means for admitting air tangentially of the casing, vanes for imparting an axial component of velocity to the air whereby the air follows a helical path bounded by the casing, a baffle in the casing providing an annular opening adjacent the side walls of the casing for passage of dust, a cylindrical dust receiving chamber on the side of the baffle opposite the air inlet, the baffle acting to deflect the air flow toward the axis of the casing, and an outlet passage extending axially into the casing from the inlet end to a point beyond the inlet but a substantial distance from the baffle, whereby air deflected inward by the baffle flows to the outlet in a helical path within and in contact with the air in the outer helical path.

3. An air cleaner comprising an elongated generally cylindrical shell having top and bottom end walls; a barrier fixed in said shell transversely to the axis thereof and dividing the interior of the shell into a separating chamber and a dust collecting chamber, the barrier being supported by a member fixed to the shell and extending coaxially thereof and fixed to one end wall and said barrier being spaced from the shell throughout its entire periphery to provide an annular opening between the two chambers; a tangential air inlet into the said end of the separating chamber remote from the barrier; an air outlet conduit extending into the said end of the separating chamber and opening beyond the inlet; and means adjacent the inlet end of the shell for utilizing the momentum of the air to impart a helical flow thereto comprising helical vanes extending inwardly from the shell.

4. A dust separator comprising a casing of circular cross-section, means for admitting air tangentially of the casing, vanes for imparting an axial component of velocity to the air whereby the air pursues a helical path bounded by the casing, a baffle in the casing providing an annular opening throughout its periphery adjacent the casing for passage of dust, a dust receiving chamber substantially cylindrical throughout its axial extent on the side of the baffle opposite the air inlet, the baffle being imperforate throughout and acting to deflect the air flow inwardly towards the axis of the casing, and an outlet passage extending axially into the casing from the inlet end thereof to a point beyond the inlet but spaced for the major portion of its extent from the baffle whereby air deflected inwardly by the baffle flows to the outlet in a helical path within said first named outer helical path.

5. An air cleaner comprising an elongated generally cylindrical shell; a barrier fixed in said shell transversely to the axis thereof and spaced from the bottom of the shell to divide the interior thereof into a dust separating chamber and a collecting chamber, the barrier being supported by a small diameter rod extending coaxially from an end wall of the shell, said barrier being spaced from the shell throughout its periphery to provide an annular passage for dust between the two chambers; a tangential air inlet opening into the end of the separating chamber remote from the barrier; and an air outlet opening into said separating chamber axially of the chamber at the same end thereof, a conduit for said outlet extending into the chamber beyond the inlet coaxially of said supporting member and terminating beyond the inlet; and means adjacent the inlet end of the shell for utilizing the momentum of the air to impart a helical flow thereto comprising helical vanes extending inwardly from the shell.

ARCHIBALD H. DAVIS.
CHARLES N. HAY.

REFERENCES CITED

The following references are of record in the file of this patent:

UNITED STATES PATENTS

| Number | Name | Date |
| --- | --- | --- |
| 420,296 | Curtis | Jan. 28, 1890 |
| 460,061 | Pratsch | Sept. 22, 1891 |
| 1,055,792 | Plock | Mar. 11, 1913 |
| 1,501,144 | Stone | July 15, 1924 |
| 1,754,126 | Stievenart | Apr. 8, 1930 |